April 8, 1969     A. KUSIK     3,437,206
COLLECTION ASSEMBLY FOR DIAGNOSTIC TESTING
Filed April 24, 1967

INVENTOR
ALAN KUSIK

BY *Hugo E. Weisberger*
ATTORNEY

United States Patent Office 3,437,206
Patented Apr. 8, 1969

3,437,206
COLLECTION ASSEMBLY FOR
DIAGNOSTIC TESTING
Alan Kusik, West Orange, N.J., assignor to Organon, Inc.,
West Orange, N.J., a corporation of New Jersey
Filed Apr. 24, 1967, Ser. No. 633,030
Int. Cl. B01d 23/20, 35/02; G01n 31/00
U.S. Cl. 210—251                              11 Claims

ABSTRACT OF THE DISCLOSURE

A device for the collection and examination of body excretions is a combination of a flexible container, a closure provided with an emptying tube containing a filter material and an inside seating surface, and a pair of forceps removably extending into the container, the legs of the forceps being fitted with a pair of opposing cups for holding and transferring excretions, all parts being made of transparent or translucent resilient plastic material.

Background of the invention

In medical and veterinary practice involving laboratory examination and diagnostic testing, it is frequently necessary to collect and transfer human and animal excretions.

A typical example of such secretions, which is mentioned solely for purposes of illustrating the principles of the present invention, is meconium, which may be defined as the first intestinal discharge of the newborn. This material may range in consistency from a liquid to a thick paste. It is viscous and adheres to surfaces with difficulty, so that it cannot easily or uniformly be spooned, resembling in this regard, egg white.

In pathology laboratories, excretions of this type have been handled inconveniently and inefficiently by gathering on wooden or plastic spatulas or in wire loops. The specimen thus gathered is then introduced into a suitable diluent liquid, and stirred vigorously to effect uniform dispersion. A portion of this dispersion is then filtered through a coarse filter or through cotton in a funnel. The filtered suspension is then taken up in a dropper and a drop is placed upon a surface, such as a glass slide, where it is admixed with a drop of a suitable reagent to produce a reaction visible to the naked eye or to microscopical examination.

With cumbersome arrangements such as those described, the collection of meconium specimens, for example, in a busy obstetrical ward, becomes difficult and subject to error and contamination because of the large amount of equipment involved. Moreover, the requirement for quantitative dilution of the specimen cannot be attained because the precise weight of the sample cannot be obtained by the use of spatulas or similar collection devices. Since the tests to be made are usually of a quantitative nature wherein the filtered drop must be of fixed dilution and of proper size to match the titer and drop-size of the reagents calibrated for the purpose, the collection and dilution methods of the prior art have frequently resulted in incorrect findings and inaccurate results, unless actually weighed beforehand. Accordingly there has been a need for a single, self-contained, complete unit assembly for the collection of body excretions and exudates which would eliminate the use of complicated equipment and attendant drawbacks.

Summary of the invention

In accordance with the present invention, there is provided an apparatus for the collection and examination of difficult-to-handle body excretions comprising the combination of a container for holding a level of a diluent liquid and having an opening, a closure member releasably mounted on the container to seal the opening, and a pair of forceps adapted to extend removably through the container opening into the container, the forceps having at the end portions of its legs a pair of cup members cooperating to pick up and hold a sample of the excretion. The various elements of the apparatus are advantageously made of a resilient transparent or translucent plastic material.

There is thus provided a single, self-contained assembly which eliminates the need for additional pieces of apparatus, which is capable of collecting the excretions in uniform, quantitative amounts, and which is capable of furnishing desired quantitative dilution of the specimens without the need of additional measuring apparatus. The device of the invention also enables the formation of a complete dispersion of the sample within the container, and subsequent filtration without resort to outside filtering means. The compact character of the device, ready disposability, and ease of shipment, all facilitate its use in hospitals and laboratories. Other details and advantages of the invention will become apparent as the following description of the embodiment thereof in the accompanying drawing proceeds.

Description of the drawing

The accompanying drawing shows schematically an embodiment of the invention, in which.

Figure 1:
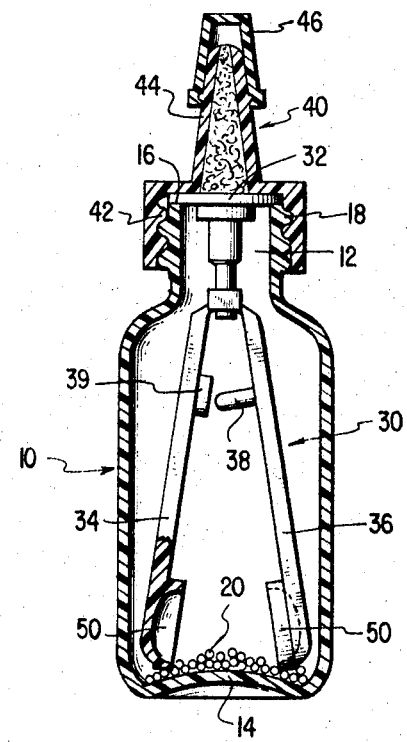
FIGURE 1 is a vertical sectional view of apparatus embodying the invention, showing the assembly of container, closure member and forceps.

Referring now to the drawing, the apparatus of the invention comprises a container, which is advantageously made of a resilient plastic material, such as polyethylene, polypropylene, or polyvinyl chloride or other vinyl plastic, and is preferably transparent, or at least translucent. While in the illustration shown in FIGURE 1, the container is depicted as a plastic, squeeze-type bottle, it will be understood that there may be employed, within the contemplation of the invention, any other type of suitable container, such as a flexible plastic bag, having a closure in the form of a multifold arrangement held in place by wire, and adapted to receive and hold the forceps.

The container is adpated to hold a measured or level amount of a suitable diluent liquid into which the contents can be dispersed. The container may be devoid of said liquid, the forceps being placed therein just as collected, the liquid being added at some later time. Still another alternate is to have within the container, a tablet containing the active ingredients of the liquid, said liquid to be reconstituted by the addition of water at some later time. To aid in this dispersion or suspension, the container may have included therein a multiplicity of small beads, which may be made of glass or suitable plastic material, or of stainless steel.

Another component of the invention is the forceps. Said forceps are made of suitable material which will not react with the diluting liquid nor with the excretion such as might interfere with the test. Said forceps may be suitably engraved or embossed.

*Description of the preferred embodiment*

Referring now particularly to FIGURE 1 of the drawing, there is shown a plastic squeeze-type bottle container 10 having an opening 12 and a closed end or bottom 14. The opening or mouth 12 of the container terminates in a flat rim 16 which is adapted to engage the disc portion 32 of the forceps 30, described more fully below, so as to support and locate the forceps in the container. The neck of the container is fitted with a screw thread 18, which may be molded in place, and which engages a corresponding screw thread 42 (FIGURE 2) on the inner surface of closure member 40. The container shown has included therein a number of small beads 20, previously described. Forceps 30 extend downward into the container and are of a size to be readily removable therefrom.

Figure 2:
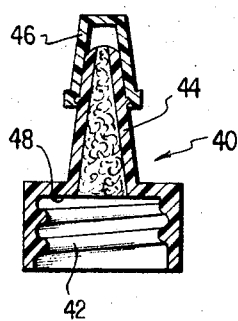
FIGURE 2 is a sectional view showing the closure member removed from the container and containing filter material.

FIGURE 2 illustrates the closure member 40 of the assembly, and may also be made of resilient plastic material, and which is fitted with screw thread 42 to engage the screw thread 18 on the neck of the container. The closure member 40 is releasably mounted on the container, and its body portion has an inner flat seating surface 48 adapted to engage the disc portion 32 of the forceps, so as to hold the disc and forceps firmly in place when the closure is screwed down onto the container opening. The closure member 30 is also provided with an elongated and upwardly extending hollow tube portion 44, which is open at its upper end, and with a removable cover cap 46 which is held in place by friction. If desired, the interior of the hollow tube 44 may be wholly or partly filled with a suitable filter medium, such as cotton or fiberglass.

Figure 3:
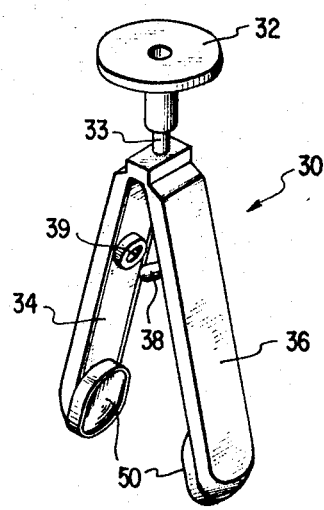
FIGURE 3 is a view in perspective of the forceps, showing the cup members and the alignment means.

Referring to FIGURE 3 of the drawing, there is shown a pair of resilient plastic forceps 30 having legs 34 and 36, which respectively are provided with means for keeping the legs in alignment when the forceps legs are advanced toward each other. Such means, in the illustrated embodiment, is a pin 38 integrally mounted on leg 36, and engaging a socket 39 in leg 34, the pin and socket each being spaced away from the leg ends. At the leg ends there are mounted a pair of cooperative cup members 50 in opposing position, which cup members are adapted to grasp and hold exudates or excretions. The cup members can be calibrated as to size, so that the forceps is capable of holding a predetermined amount of a specimen. On the upper portion of the forceps there is mounted on the body portion 30 of the forceps an elongated portion or stem 33, which serves to support a sealing member, shown as a disc 32, which fits against the opening of the container 10, and seats against the seating surface 48 of the closure member 42. The disc 32 acts as a seal, and also serves to position the forceps in the center of the container.

In the operation of the device, the closure member is removed, the forceps lifted out by the stem, and the meconium or other exudation or excretion to be tested is picked up by pinching the forceps so as to gather the sample within the cooperating cup members of the forceps. Holding the forceps closed, the excess specimen is either wiped off or rinsed off, and the forceps, holding the excretion, is inserted into the container holding the diluent liquid. The forceps then automatically opens and releases the specimen. The closure is then replaced tightly and the container assembly is then shaken vigorously. The beads help to loosen excretion adhering to the cups, and break up the specimen to provide uniform dispersion and suspension in the diluent liquid. The closure is then opened, the forceps removed and set aside or discarded. The bottle is then closed again with the closure and cap. The container is labeled with pertinent patient data and sent to the laboratory. By inverting the container, a drop of the contents is squeezed onto the testing surface. A suitable reagent is added to the drop to be tested, mixed, and the reaction results are observed. Suitable controls may be used. The container can be preserved or discarded. The nurse or technician is thus enabled to pick up the specimen without touching it, and the cups of the forceps, being calibrated, pick up a precise weight or volume of specimen, whether liquid or paste. The transparent or translucent character of the forceps plastic material permits visual observation that the cups are filled. The tapered closure with its content of coarse filter material such as glass wool or cotton, filters out particles which might interfere with the test. The complete assembly is inexpensive and may be discarded after each test, thus avoiding any possibility of cross-contamination or confusion of identity. The container, holding the specimen in the diluent with a suitable preservative, can readily be shipped through the mails.

Figure 4:
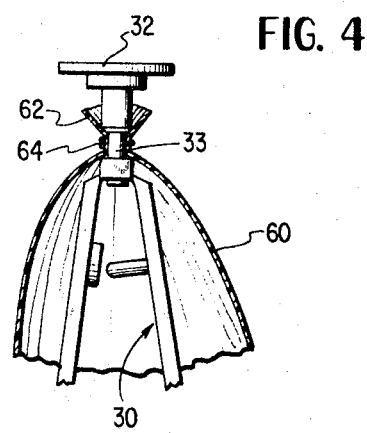
FIGURE 4 is a view showing the combination of a flexible plastic bag container and forceps.

FIGURE 4 illustrates a flexible plastic bag container 60 having a multifold neck 62, adapted to be held in place by wire 64 around the neck 33 of the forceps.

What is claimed is:

1. Apparatus for the collection and examination of body excretions, secretions and the like, comprising, in combination:
   (a) a container for holding a level of a diluent liquid and having an opening therein;
   (b) a closure member releasably mounted on said container sealing said opening and having an inner seating surface; and
   (c) a pair of forceps adapted to extend removably through said opening into said container and including a body portion embodying sealing means engageable between said closure seating surface and the container body surrounding said opening, a pair of legs extending from said body portion, and a pair of cooperative cup members respectively at the free end portions of said legs adapted cooperatively to collect and to hold excretions.

2. The apparatus of claim 1 in which said closure member is provided with an upwardly extending hollow tube at its upper end, and a removable cover cap in frictional engagement over the opening of said hollow tube.

3. The apparatus of claim 2 comprising filter material in said hollow tube.

4. The apparatus of claim 1 in which said forceps body portion comprises an elongated part and said sealing means comprises a disc on one end of said part.

5. The apparatus of claim 1 in which said forceps legs respectively are provided with aligning means spaced inwardly from said free end portions for securing registry of said opposing cup members.

6. The apparatus of claim 5 in which said aligning means comprises an opposing pin and socket element.

7. The apparatus of claim 1 in which the container is a squeeze-type plastic bottle and the container and closure members are screw-fitted.

8. The apparatus of claim 1 in which the container is a flexible plastic bag, having a closure in the form of a multifolding neck adapted to receive and engage said forceps.

9. The apparatus of claim 1 in which said forceps is made of a resilient plastic material.

10. The apparatus of claim 1 in which said forceps extends into said container which does not contain liquid.

11. The apparatus of claim 1 in which said container includes a tablet containing the active ingredients of the diluent liquid, whereby said diluent liquid can be reconstituted by the addition of water at a later time.

References Cited

UNITED STATES PATENTS

| | | | |
|---|---|---|---|
| 420,262 | 1/1890 | Boemeamann | 210—251 X |
| 663,271 | 12/1900 | Hamilton | 210—251 |
| 2,063,778 | 12/1936 | Andrus | 210—198 X |
| 2,558,987 | 7/1951 | Shaw | 210—244 X |
| 3,185,550 | 5/1965 | Haack | 23—253 |

REUBEN FRIEDMAN, *Primary Examiner.*

JOHN ADEE, *Assistant Examiner.*

U.S. Cl. X.R.

23—253; 210—464